(12) United States Patent
Fontanet (10) Patent No.: US 10,816,364 B2
(45) Date of Patent: Oct. 27, 2020

(54) INDUCTIVE POSITION SENSOR WITH SECONDARY TURNS EXTENDING THROUGH A PRINTED CIRCUIT BOARD

(71) Applicants: Continental Automotive France, Toulouse (FR); Continental Automotive GmbH, Hannover (DE)

(72) Inventor: Alain Fontanet, Muret (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/614,090

(22) PCT Filed: Jun. 28, 2018

(86) PCT No.: PCT/FR2018/051595
§ 371 (c)(1),
(2) Date: Nov. 15, 2019

(87) PCT Pub. No.: WO2019/002779
PCT Pub. Date: Jan. 3, 2019

(65) Prior Publication Data
US 2020/0173812 A1 Jun. 4, 2020

(30) Foreign Application Priority Data
Jun. 30, 2017 (FR) ...................................... 17 56115

(51) Int. Cl.
*G01B 7/14* (2006.01)
*G01D 5/20* (2006.01)
(Continued)

(52) U.S. Cl.
CPC ............. *G01D 5/2053* (2013.01); *G01B 7/30* (2013.01); *G01D 5/2291* (2013.01); *H01F 17/0013* (2013.01)

(58) Field of Classification Search
CPC .... G01D 5/2046; G01D 5/205; G01D 5/2053; G01D 5/202; G01D 5/2216; G01D 5/2033; G01B 7/30; G01B 7/003; G01B 7/14
See application file for complete search history.

(56) References Cited

U.S. PATENT DOCUMENTS 6,124,708 A * 9/2000 Dames ................. G01D 5/2053
324/207.12
9,228,823 B2 1/2016 Fontanet et al.
(Continued)

FOREIGN PATENT DOCUMENTS

FR 3002034 A1 8/2014

OTHER PUBLICATIONS

English Translation of the Written Opinion for International Application No. PCT/FR2018/051595, dated Nov. 12, 2018, 4 pages.
(Continued)

*Primary Examiner* — Thang X Le
(74) *Attorney, Agent, or Firm* — RatnerPrestia (57) ABSTRACT

An inductive position sensor including at least two secondary windings consisting of a plurality of turns that are formed on two opposite faces of a printed circuit board and divided into first and second sectors. The first and second sectors are divided, in one turn width, into a first portion on one face of the printed circuit board and a second portion on an opposite face. The second portion of the first sector is extended by a first portion of the second sector and the first portion of the first sector is connected to the second portion of the second sector of a neighboring turn. The portions are connected pairwise by a respective via passing through the printed circuit board.

11 Claims, 4 Drawing Sheets

(51) Int. Cl.
*G01B 7/30* (2006.01)
*G01D 5/22* (2006.01)
*H01F 17/00* (2006.01)

(56) References Cited

U.S. PATENT DOCUMENTS

| | | | |
|---|---|---|---|
| 2002/0097042 | A1 | 7/2002 | Kawate et al. |
| 2013/0082692 | A1* | 4/2013 | Howard ................. G01B 7/003 324/207.15 |
| 2018/0113004 | A1* | 4/2018 | Cook ................... G01D 5/2216 |
| 2019/0301895 | A1* | 10/2019 | Cook ..................... G01B 3/205 |
| 2020/0003583 | A1* | 1/2020 | Cook ................... G01D 5/2013 |

OTHER PUBLICATIONS

International Search Report and Written Opinion for International Application No. PCT/FR2018/051595, dated Nov. 12, 2018, 7 pages.

\* cited by examiner

Fig 1

Prior Art

Fig 2

Prior Art

Fig 3

Prior Art

INDUCTIVE POSITION SENSOR WITH SECONDARY TURNS EXTENDING THROUGH A PRINTED CIRCUIT BOARD

CROSS REFERENCE TO RELATED APPLICATIONS

This application is the U.S. National Phase Application of PCT International Application No. PCT/FR2018/051595, filed Jun. 28, 2018, which claims priority to French Patent. Application No. 1756115, filed Jun. 30, 2017, the contents of such applications being incorporated by reference herein.

FIELD OF THE INVENTION

The present invention relates to an inductive position sensor.

BACKGROUND OF THE INVENTION

This type of sensor has the advantage of making it possible to determine the position of a mechanical part, or of any other element, without requiring contact with the part of which it is desired to ascertain the position. This advantage is such that these sensors have numerous applications in a wide variety of industries. Such sensors are also used in consumer applications such as, for example, the automotive field, within which the present invention is preferably implemented. However, the invention may be used in a wide variety of other fields.

The operating principle of an inductive sensor is based on the variation in coupling between a primary winding and secondary windings of a transformer operating at high frequency and without the use of a magnetic circuit. The coupling between these windings varies with the position of an electrically conductive moving part, which is generally referred to as the "target". Specifically, currents induced in the target modify the currents induced in the secondary windings. By adjusting the configuration of the windings and with knowledge of the current injected into the primary winding, measuring the voltage induced in the secondary windings allows the position of the target to be determined.

To incorporate such an inductive sensor into a device, in particular an electronic device, it is known practice to produce the transformer mentioned above on a printed circuit board. The primary winding and the secondary windings then consist of tracks routed on the printed circuit board. The primary winding is then for example supplied with power by an external source and the secondary windings are then subject to voltages induced by the magnetic field produced by a current flowing through the primary winding.

The target, which is a conductive, for example metal, part, may be simple in shape. It may for example be a part cut from a metal sheet. To produce a linear sensor, the target is for example cut rectangularly while for a rotary sensor, it will be cut for example in the shape of an angular sector with a radius and angle suited to the motion of the part.

Generally, two sets of secondary windings are designed so as to acquire, over one complete travel of the sensor, sine and cosine functions of the position of the target. Such cosine and sine functions are well known and may easily be processed by an electronic system. By determining the ratio of the sine to the cosine and then applying an arctangent function, an image of the position of the target is obtained. The argument of the sine and cosine functions is a linear, or affine, function of the position of the target, the travel of which then represents a greater or lesser portion of the spatial period of these trigonometric functions.

To obtain induced currents that can be measured reliably, it is preferable to have either a large number of turns or turns of large size. The second option is not compatible with producing a compact sensor. Because of this, the choice is generally made to have a large number of turns.

To limit the space occupied on the printed circuit board, it has been proposed, in particular by document FR-A-3 002 034, incorporated herein by reference, to produce turns for forming secondary windings on two distinct layers of the printed circuit board. To achieve this, vias passing through the printed circuit board should be produced in order to allow the turns thus produced to be connected. Such a turn has successive first and second sectors in a longitudinal direction of the turn. Each turn portion is in the shape of a linear or angular sector. When viewing the turn from a distance, the average plane of this turn may be seen as inclined with respect to the plane of the board.

Such an inductive sensor exhibits a certain degree of sensitivity to variation in the airgap. However, it would be preferable for such a sensor to be insensitive to geometric variations other than the position that it is desired to measure, these geometric variations possibly being a variation in airgap or a variation in eccentricity. Shaping the turns in the way proposed by the closest prior art does not allow the problems of geometric variations to be solved.

SUMMARY OF THE INVENTION

The problem upon which an aspect of the invention is based is that of designing an inductive sensor having an arrangement of secondary turns that makes the sensor insensitive to geometric variations and to eccentricity.

To this end, an aspect of the present invention relates to an inductive position sensor including a primary winding and at least two secondary windings, each consisting of a plurality of turns formed on two opposite faces of a printed circuit board, each secondary winding including turns each having substantially the same shape and said turns being aligned in what is referred to as a longitudinal direction with, each time, an offset in the longitudinal direction, each of said turns being divided, in one turn length, into a first sector and a second sector, which are complementary and successive, noteworthy in that:
  the first sector is divided, in one turn width, into a first portion that is arranged on a face of the printed circuit board referred to as the first face and a second portion that is arranged on a face of the printed circuit board opposite the first face, the opposite face being referred to as the second face, the first and second portions of the first sector being complementary;
  the second portion of the first sector is extended, in the length of the turn, by a first portion of the second sector, which portion is arranged on the first face of the printed circuit board;
  the first portion of the second sector is extended, in the width of the turn, by a second portion of the second sector, which portion is arranged on the second face of the printed circuit board, the first and second portions of the second sector dividing the second sector widthwise while being complementary;
  the first portion of the first sector is connected to the second portion of the second sector of a neighboring turn;
  the first and second portions of the first sector, the second portion of the first sector and the first portion of the second sector, the first portion of the second sector and the second portion of the second sector as well as the second portion of the second sector of a neighboring turn and the first portion of the first sector are connected by a respective via passing through the printed circuit board.

The technical effect is that of correcting and balancing a turn of the prior art which had two, respectively upper and lower, longitudinal sectors. The problem with this turn is its tilted appearance along its length. By dividing each sector into two lateral portions that are located at different levels and on opposite faces of the printed circuit board, the pattern of the turn is more balanced lengthwise by no longer being in the shape of two sectors of different heights.

Each sector is divided across lateral portions, with a first portion of the first sector kept the same with respect to a turn of the prior art and a second portion lowered by being placed on the other face of the printed circuit board. For the second sector, a first portion is raised and a second portion is kept the same.

This allows the sensitivity to variation in airgap and the sensitivity to variation in eccentricity to be greatly decreased and the linearity of the sensor to be enhanced.

Specifically, calculations have shown that, for an eccentricity of the target of 0.5 mm for a 360° sensor, before implementing an aspect of the present invention, linearity was in the vicinity of 1.5% and sensitivity to the airgap was 0.5%. After implementing an aspect of the present invention, linearity is close to 0.5% and sensitivity to the airgap is close to 0.3%. There is a gain in the performance of the sensor by a factor of the order of two.

Moreover, since each turn passes through the printed circuit board four times, it is better anchored in place and the turns are not at risk of moving either longitudinally or laterally with respect to the printed circuit board.

Advantageously, for each turn:
the first and second portions of the first sector have lateral edges, respectively, on the first face and the second face of the printed circuit board with the facing ends of their lateral edges being connected by a first via;
the second portion of the first sector and the first portion of the second sector have longitudinal edges, respectively, on the second face and the first face of the printed circuit board with the facing ends of their longitudinal edges being connected by a second via;
the first and second portions of the second sector have lateral edges, respectively, on the first face and the second face of the printed circuit board with the facing ends of their lateral edges being connected by a third via;
the second portion of the second sector of a neighboring turn and the first portion of the first sector have longitudinal edges, respectively, on the second face and the first face of the printed circuit board with the facing ends of their longitudinal edges being connected by a fourth via.

Advantageously, the connection between the end of the longitudinal edge of the first portion of the first sector and the fourth via and the connection between the end of the longitudinal edge of the first portion of the second sector and the second via are in one and the same plane that is parallel to the printed circuit board, the second and fourth vias being of the same length. This makes it possible to have a symmetry contributing to the balance of the turn.

Advantageously, the first via and the third via are of the same length.

Advantageously, the longitudinal edges of the first and second portions of the first sector and, respectively, of the second sector are oriented toward one another in superposed planes.

Advantageously, the first and second sectors are equal in length and the offset in the longitudinal direction between two neighboring turns is smaller than the length of the first or of the second sector. This makes it possible to optimize the number of turns over a given area.

Advantageously, the longitudinal offset between two turns is constant. This makes it possible to facilitate the use of the voltage measurements taken at the terminals of the secondary windings.

Advantageously, the first and second portions of the first sector or, respectively, of the second sector are divided so that the first and second portions of the first sector or, respectively, of the second sector receive an equal amount of magnetic flux.

Advantageously, the primary winding surrounds the secondary windings and has turns including linear portions extending longitudinally.

Advantageously, the turns of one and the same secondary winding are connected to one another such that the electromotive forces induced in these turns by an alternating magnetic field are added together.

BRIEF DESCRIPTION OF THE DRAWINGS

Other features, aims and advantages of aspects of the present invention will become apparent upon reading the following detailed description and with reference to the appended drawings, given by way of nonlimiting example and in which.

DETAILED DESCRIPTION OF THE PREFERRED EMBODIMENTS

Figure 1:
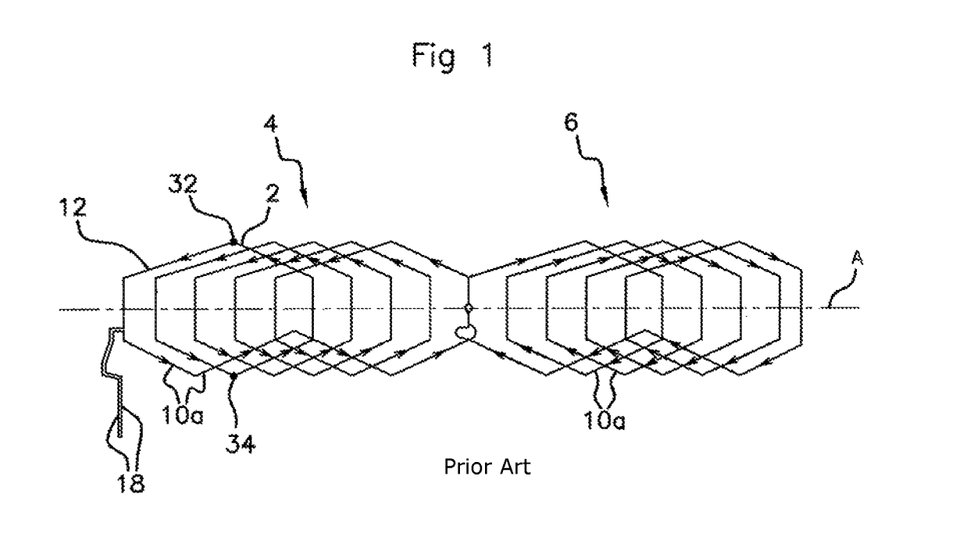
FIG. 1 is a schematic representation of a view from above of two secondary windings of a position sensor according to the prior art.
Figure 2:
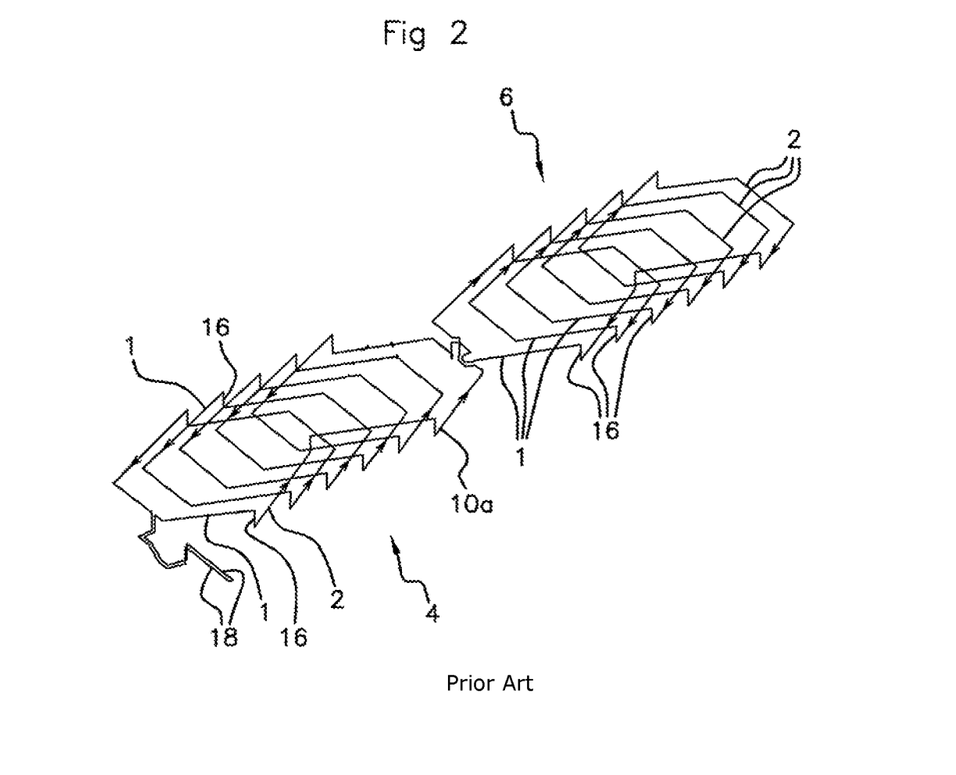
FIG. 2 is a schematic representation of a perspective view of the secondary windings of FIG. 1.

FIG. 1 shows a view from above of a first secondary winding 4 and a second secondary winding 6 and FIG. 2 is a perspective view of the secondary windings of FIG. 1. Each of these two windings has turns 10a. These turns 10a are in accordance with the prior art but FIG. 1 and FIG. 2, which is described below, may be used to illustrate an aspect of the present invention if the shape of the turns 10a is disregarded, and only for the stacked arrangement of the turns 10a.

It should be noted that for each of these windings, the turns 10a are all substantially similar, but are offset each time with respect to one another in a longitudinal direction illustrated in FIG. 1 by a longitudinal axis A.

The longitudinal offset between two neighboring turns may be the same each time. Furthermore, and again preferably, the second secondary winding 6, is, when seen from above, symmetrical with respect to the first secondary winding 4 in relation to a transverse plane (not shown) that is orthogonal to the longitudinal axis. The number of turns of the two windings is identical and the area of the turns is also identical.

Figure 3:
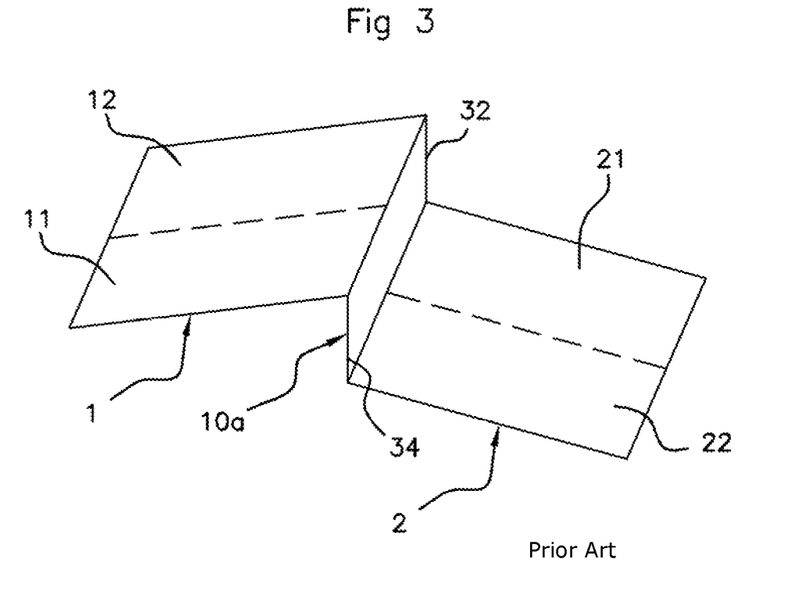
FIG. 3 is a schematic representation of a perspective view of a turn according to the prior art.

As shown in FIG. 3, in the prior art and not for an aspect of the present invention, each turn 10a has a first, upper sector 1 and a second, lower sector 2, the first sector 1 corresponding to a track etched on one layer of a printed circuit board (not shown) and the second, lower sector 2 corresponding to a track etched on another, opposite layer of the same printed circuit board. Electrical continuity between said tracks forming the first sector 1 and the second sector 2 is provided by a via 32 passing through the printed circuit board within which a segment, bearing the reference 16 in FIG. 2, provides electrical continuity.

Electrical continuity between two neighboring turns is provided in the following way: the first, upper sector 12 of a turn 10a is connected to a second, lower sector 2 of a neighboring turn by another via 34 passing through the printed circuit board within which a segment provides said electrical continuity. Each first, upper sector 1 and each second, lower sector 2 may take, in the embodiment shown in FIGS. 1 and 2, the shape of an irregular semihexagon.

Each first, upper sector 1 and each second, lower sector 2 thus each take an overall concave shape, the concavity of the first sector 1 of a turn 10a being oriented inversely with respect to the concavity of the second, lower sector 2 of the same turn.

More generally, in a secondary winding, the concavity of the first, upper sectors 1 is oriented toward a first side and the concavity of the second sectors 2 is oriented toward the side opposite the first side. It would thus be possible to have lower and/or upper portions in the shape of circular arcs, elliptical arcs, semioctagons, etc. When viewed from above, it is possible to see a certain symmetry between a first, upper sector 1 and a corresponding second, lower sector 2 with respect to a straight line passing through the vias 32, 34. The symmetry is not perfect due to the offset between the turns.

Referring back to FIGS. 1 and 2, the segments 16, one of which is referenced in FIG. 2, the position of which also corresponds to that of the vias to which they are connected, are aligned with two parallel segments that are arranged on either side of the longitudinal axis A and are perpendicular thereto, i.e. they pass through the printed circuit board. These two segments are not arranged symmetrically with respect to the longitudinal axis A but are offset in the longitudinal direction defined by the longitudinal axis.

The first secondary winding 4 and the second secondary winding 6 are connected at the level of the transverse plane of symmetry such that, for a given variable magnetic flux, the electromotive forces induced in the first secondary winding 4 oppose the electromotive forces induced in the second secondary winding 6. Within one and the same winding, it should be noted that the electromotive forces induced by a variable magnetic flux in each of the turns 10a are added together.

Lastly, it is possible to see, on the left-hand side of FIGS. 1 and 2, the presence of two connecting tracks 18 allowing the secondary windings to be connected to a device for measuring the voltage at the terminals thereof.

The assembly formed by the first secondary winding 4 and by the second secondary winding 6 make it possible for example to acquire a sine function when a conductive target moves in proximity to these windings. To acquire a cosine function during the movement of the target, it is known practice to use another set of windings that is superposed over the first set of windings.

FIG. 3 shows an individual turn according to the prior art. Such a turn 10a is divided, in one turn length, into a first sector 1, referred to as the upper sector, and a second, lower sector 2, the first and second sectors 1, 2 being complementary and successive. As mentioned above, two vias 32 and 34 are provided on the longitudinal edges of the turn 10a at the respective junction between the longitudinal edges of the first and second sectors 1, 2.

For a turn 10a of the prior art, if the first sector 1 or the second sector 2 is artificially divided, respectively, in one turn width, into first and second portions 11, 12; 21, 22, these respective pairs of two portions are substantially at the same level by being arranged on one and the same respective face of the printed circuit board, referred to as the first face for the first sector 1, or on the second face for the second sector 2. There is therefore no difference in level between each of the "artificial" pairs of first and second portions 11, 12; 21, 22 for the first and second sectors 1, 2.

An inductive position sensor according to an aspect of the present invention has the following features in common with an inductive position sensor of the prior art.

As can be seen in FIGS. 1 and 2, for a sensor of the prior art, although still valid for a sensor according to an aspect of the present invention with the exception of the features of the turns 10a, which are replaced with turns 10, an inductive position sensor includes a primary winding and at least two secondary windings 4, 6, each of which consists of a plurality of turns 10 that are each formed on two opposite faces of a printed circuit board.

A secondary winding 4, 6 includes turns 10 each taking substantially the same shape, said turns 10 being aligned in what is referred to as a longitudinal direction with, each time, an offset in the longitudinal direction. Each of said turns 10 is divided, in one turn 10 length, into a first sector 1 and a second sector 2, which are complementary and successive.

FIGS. 4 to 8 show a turn 10 forming part of a secondary winding of an inductive position sensor according to an aspect of the present invention.

According to an aspect of the invention, the first sector 1 is divided, in one turn 10 width, into a first portion 11 that is arranged on a face of the printed circuit board referred to as the first face and a second portion 12 that is arranged on a face of the printed circuit board opposite the first face, the opposite face being referred to as the second face, the first and second portions 11, 12 of the first sector 1 being complementary;

The second portion 12 of the first sector 1 is extended, in the length of the turn 10, by a first portion 21 of the second sector 2, which portion is arranged on the first face of the printed circuit board, the first portion 21 of the second sector 2 being extended, in the width of the turn 10, by a second portion 22 of the second sector 2, which portion is arranged on the second face of the printed circuit board, the first and second portions 21, 22 of the second sector 2 dividing the second sector 2 widthwise while being complementary.

The first portion 11 of the first sector 1 is also connected to the second portion of the second sector of a neighboring turn. Respectively, being grouped into pairs, the first and second portions 11, 12 of the first sector 1, the second portion 12 of the first sector 1 and the first portion 21 of the second sector 2, the first portion 21 of the second sector 2 and the second portion 22 of the second sector 2 as well as the second portion of the second sector of a neighboring turn and the first portion 11 of the first sector 1 are connected pairwise by a respective via 31 to 34 passing through the printed circuit board.

It follows that for each of the two sectors 1, 2 of the turn 10, this sector 1 or 2 has a difference in level between two lateral portions 11, 12; 21, 22 of the sector 1, 2. For each sector 1, 2, one portion 11 or 21 is on a first face of the printed circuit board and the associated other portion 12 or 22 is on the second face of the printed circuit board. There are therefore no longer upper 1 or lower 2 sectors as envisaged by the prior art, but rather sectors 1, 2 dividing the turn 10 longitudinally, with each sector 1, 2 being divided over the two faces of the printed circuit board, a portion 11 or 12 of the first sector 1 on one face of the board being extended by a portion 22 or 21 of the second sector 2 on the other face and vice versa, two portions 11, 12; 21, 22 of one and the same sector 1, 2 lying on different faces of the printed circuit board.

In FIGS. 4 to 8, the portions 11, 12; 21, 22 of the first and second sectors 1, 2 are depicted as relatively planar, but this may be otherwise. Similarly, the portions 11, 12; 21, 22 of one and the same first 1 or second 2 sector are not necessarily equal in size; what matters is that one and the same magnetic flux flows through them. The first and second portions 11, 12; 21, 22 of the first sector 1 or, respectively, of the second sector 2 may therefore be divided primarily so that two portions 11, 12 or 21, 22 of one and the same sector 1 or 2, for example the first and second portions 11, 12 of the first sector 1 or, respectively, the first and second portions 21, 22 of the second sector 2 receive an equal amount of magnetic flux.

Figure 4:
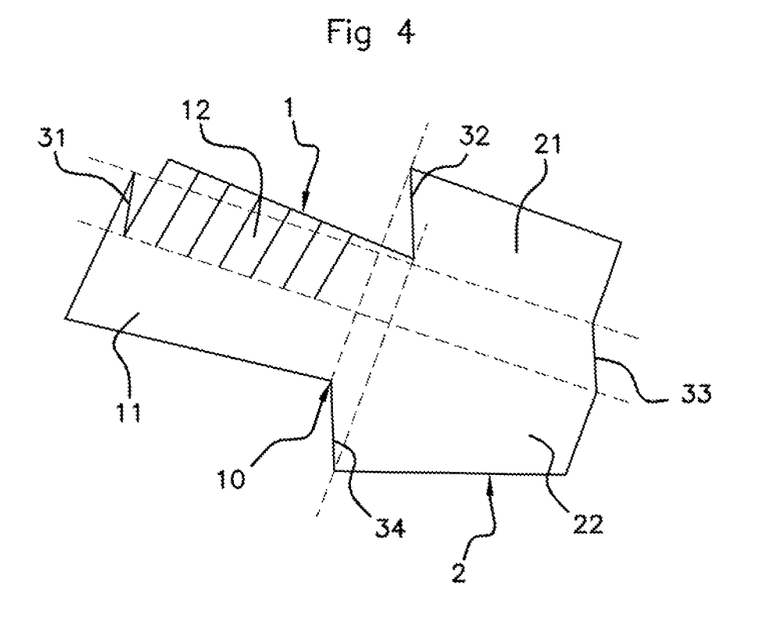
FIGS. 4 to 7 are schematic representations of a perspective view of a turn according to one embodiment of the present invention with respective hatching for each of these figures of a specific portion of a first or of a second longitudinal sector of the turn.
Figure 5:
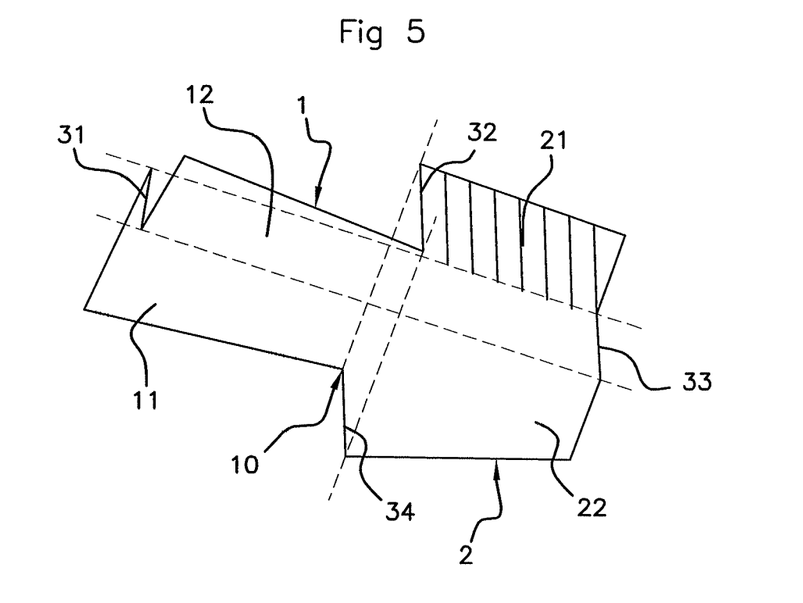
Figure 6:
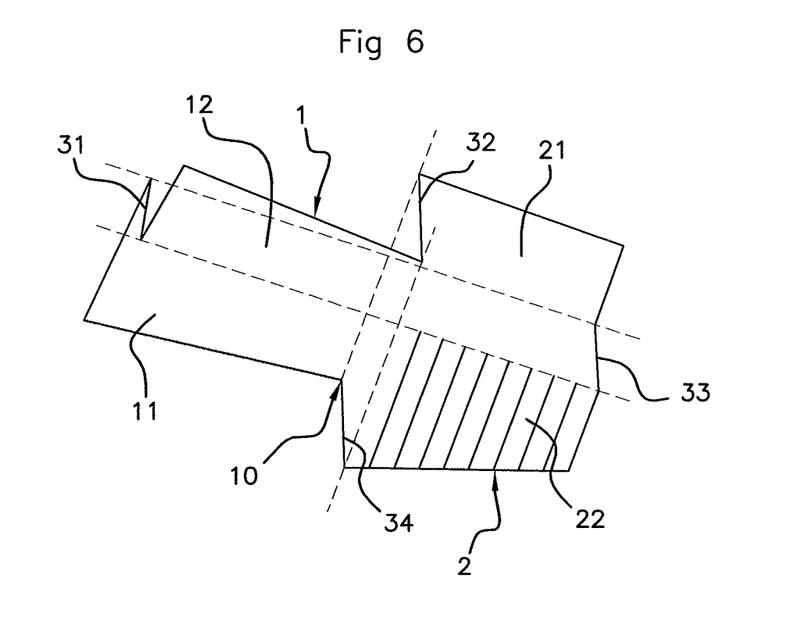
Figure 7:
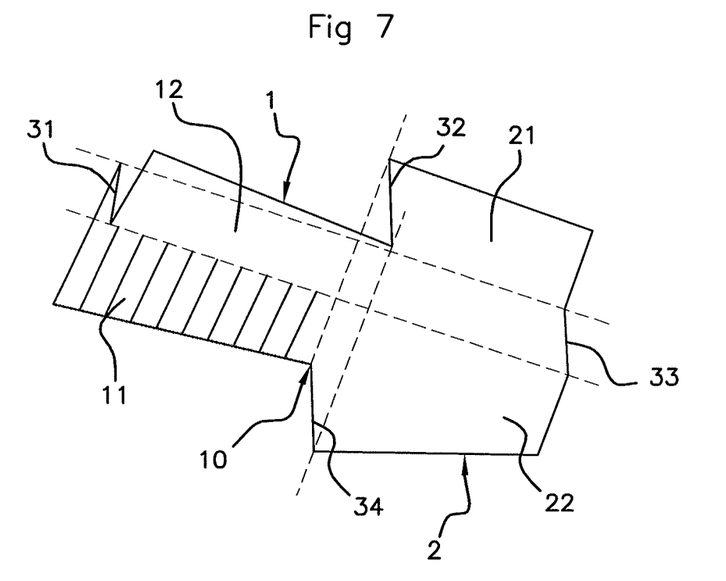
Figure 8:
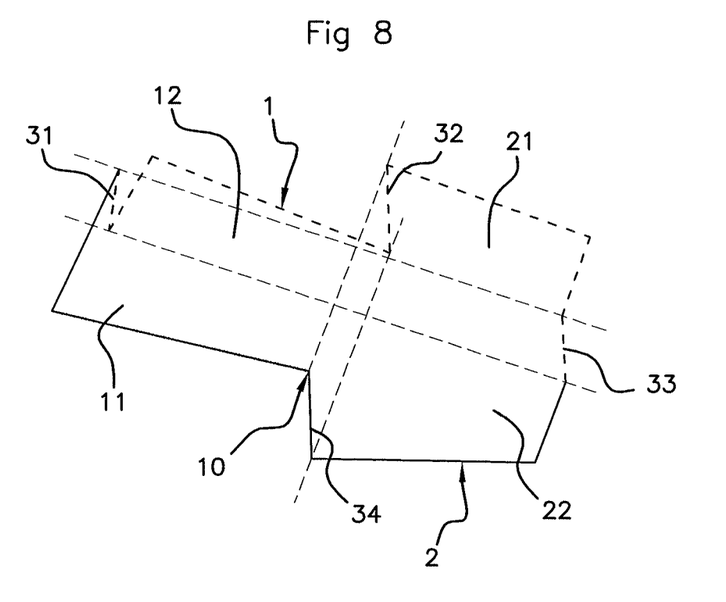
FIG. 8 is a schematic representation of the turn illustrated in FIGS. 4 to 7, with the turn portions that have been modified with respect to a turn according to the prior art illustrated in FIG. 3 depicted using dashed lines.

In FIG. 4, the second portion 12 of the first sector 1 is hatched so as to make it more visible. In FIG. 5, the first portion 21 of the second sector 2 is hatched, while in FIG. 6, the second portion 22 of the second sector 2 is hatched. In FIG. 7, the first portion 11 of the first sector 1 is hatched. In FIG. 8, the portions of the turn 10 that have been modified with respect to a turn 10a of the prior art shown in FIG. 3 are depicted using dashed lines.

The alignment of the first and second sectors 1, 2 is not necessarily linear. It may also be a circular, or possibly an elliptical, arc. A person skilled in the art will have understood that this alignment corresponds to the direction of movement of the object of which it is desired to ascertain the position. This is most commonly a linear movement with, in this case, the use of a linear position sensor. However, it may also be a movement following a curved, most commonly circular, trajectory.

For each turn, the first and second portions 11, 12 of the first sector 1 may have lateral edges, respectively, on the first face and the second face of the printed circuit board with the facing ends of their lateral edges being connected by a first via 31.

The first and second sectors 1, 2 may be semihexagonal in shape with, however, for the first sector 1, a second portion 12 and, for the second sector 2, a second portion 22 which are sunken by being arranged on the other face of the printed circuit board with respect to the first portion 11 of the first sector 1 or the first portion 21 of the second sector 2. The turns 10 may be produced by forming linear portions and the number of linear portions is limited without overly negatively affecting the area of the turn.

For each turn, the second portion 12 of the first sector 1 and the first portion 21 of the second sector 2 may have longitudinal edges, respectively, on the second face and the first face of the printed circuit board with the facing ends of their longitudinal edges being connected by a second via 32; this second via 32 may also be used to connect to a turn that is adjacent to the turn 10 described at present.

The first and second portions 21, 22 of the second sector 2 may have lateral edges, respectively, on the first face and the second face of the printed circuit board with the facing ends of their lateral edges being connected by a third via 33. The top or bottom ends of the first via 31 may be aligned with the top or bottom ends of the third via 33 along the longitudinal axis of the turn 10.

Lastly, the second portion 22 of the second sector 2 of a neighboring turn 10 and the first portion 11 of the first sector 1 have longitudinal edges, respectively, on the second face and the first face of the printed circuit board with the facing ends of their longitudinal edges being connected by a fourth via 34.

The connection between the end of the longitudinal edge of the first portion 11 of the first sector 1 and the fourth via 34 and the connection between the end of the longitudinal edge of the first portion 21 of the second sector 2 and the second via 32 may be in one and the same plane that is parallel to the printed circuit board, the second and fourth vias 34 being of the same length.

The same may apply for a common length of the first via 31 and of the third via 33. The four vias 31 to 34 may also be of the same length.

The longitudinal edges of the first and second portions 11, 12 of the first sector 1 and, respectively, of the second sector 2 may be oriented toward one another in superposed planes. One end of the longitudinal edge of the second portion 12 of the first sector 1 may be connected to the lower end of the second via 32 and one end of the longitudinal edge of the first portion 21 of the second sector 2 may be connected to the upper end of the second via 32.

The first and second sectors 1, 2 may be equal in length and the offset in the longitudinal direction between two neighboring turns 10 may be smaller than the length of the first 1 or of the second sector 2. This offset in the longitudinal direction may be constant.

With reference to FIGS. 1, 2 and to any one of FIGS. 4 to 8, while bearing in mind that the turns 10a shown in these figures must be replaced with turns 10 in accordance with an aspect of the present invention, the primary winding may surround the secondary windings 4, 6 by having turns 10 including linear portions extending longitudinally. A sensor according to an aspect of the invention may include two sets of secondary windings 4, 6, one for acquiring a sine function and the other for acquiring a cosine function.

One of these sets of secondary windings 4, 6 may include for example two secondary windings 4, 6 that are arranged symmetrically with respect to a median axis A and are connected such that the electromotive forces induced in the turns 10 of a first secondary winding 4, 6 oppose the electromotive forces induced in the turns 10 of the second secondary winding 4, 6. There may be more than two secondary windings 4, 6, in particular redundant secondary windings 4, 6.

The turns 10 of one and the same secondary winding 4, 6 may be connected to one another such that the electromotive forces induced in these turns 10 by an alternating magnetic field are added together.

Aspects of the present invention are not limited to the embodiment described above and to the variants presented by way of nonlimiting examples. It also relates to all variants within the scope of a person skilled in the art within the framework defined by the claims hereinafter.

The invention claimed is:

1. An inductive position sensor including a primary winding and at least two secondary windings, each comprising a plurality of turns formed on two opposite faces of a printed circuit board, each secondary winding including turns each having substantially the same shape and said turns being aligned in what is referred to as a longitudinal direction with, each time, an offset in the longitudinal direction, each of said turns being divided, in one turn length, into a first sector and a second sector, which are complementary and successive, wherein:

the first sector is divided, in one turn width, into a first portion that is arranged on a face of the printed circuit board referred to as the first face and a second portion that is arranged on a face of the printed circuit board opposite the first face, the opposite face being referred to as the second face, the first and second portions of the first sector being complementary;

the second portion of the first sector is extended, in the length of the turn, by a first portion of the second sector, which portion is arranged on the first face of the printed circuit board;

the first portion of the second sector is extended, in the width of the turn, by a second portion of the second sector, which portion is arranged on the second face of the printed circuit board, the first and second portions of the second sector dividing the second sector widthwise while being complementary;

the first portion of the first sector is connected to the second portion of the second sector of a neighboring turn; and the first and second portions of the first sector, the second portion of the first sector and the first portion of the second sector, the first portion of the second sector and the second portion of the second sector as well as the second portion of the second sector of a neighboring turn and the first portion of the first sector are connected by a respective via passing through the printed circuit board.

2. The inductive position sensor as claimed in claim 1, wherein, for each turn:

the first and second portions of the first sector have lateral edges, respectively, on the first face and the second face of the printed circuit board with the facing ends of their lateral edges being connected by a first via;

the second portion of the first sector and the first portion of the second sector have longitudinal edges, respectively, on the second face and the first face of the printed circuit board with the facing ends of their longitudinal edges being connected by a second via;

the first and second portions of the second sector have lateral edges, respectively, on the first face and the second face of the printed circuit board with the facing ends of their lateral edges being connected by a third via; and the second portion of the second sector of a neighboring turn and the first portion of the first sector have longitudinal edges, respectively, on the second face and the first face of the printed circuit board with the facing ends of their longitudinal edges being connected by a fourth via.

3. The inductive position sensor as claimed in claim 2, wherein the connection between the end of the longitudinal edge of the first portion of the first sector and the fourth via and the connection between the end of the longitudinal edge of the first portion of the second sector and the second via are in one and the same plane that is parallel to the printed circuit board, the second and fourth vias being of the same length.

4. The inductive position sensor as claimed in claim 2, wherein the first via and the third via are of the same length.

5. The inductive position sensor as claimed in claim 1, wherein the longitudinal edges of the first and second portions of the first sector and, respectively, of the second sector are oriented toward one another in superposed planes.

6. The inductive position sensor as claimed in claim 1, wherein the first and second sectors are equal in length and the offset in the longitudinal direction between two neighboring turns is smaller than the length of the first or of the second sector.

7. The inductive position sensor as claimed in claim 1, wherein the longitudinal offset between two turns is constant.

8. The inductive position sensor as claimed in claim 1, wherein the first and second portions of the first sector or, respectively, of the second sector are divided so that the first and second portions of the first sector or, respectively, of the second sector receive an equal amount of magnetic flux.

9. The inductive position sensor as claimed in claim 1, wherein the primary winding surrounds the secondary windings and has turns including linear portions extending longitudinally.

10. The inductive position sensor as claimed in claim 9, wherein the turns of one and the same secondary winding are connected to one another such that the electromotive forces induced in these turns by an alternating magnetic field are added together.

11. The inductive position sensor as claimed in claim 3, wherein the first via and the third via are of the same length.

* * * * *